United States Patent [19]

Grayson et al.

[11] Patent Number: 4,888,053

[45] Date of Patent: Dec. 19, 1989

[54] CHLORIDE LEACHING OF IRON-BASED, HEAVY METAL-CONTAINING SLUDGES

[75] Inventors: Gerard Grayson, Irvine; Morton M. Wong, Placentia, both of Calif.

[73] Assignee: Union Oil Co. of California, Brea, Calif.

[21] Appl. No.: 216,158

[22] Filed: Jul. 7, 1988

[51] Int. Cl.$^4$ .............................................. C02F 11/00
[52] U.S. Cl. .................... 75/101 R; 75/114; 423/38; 423/39; 423/40; 423/109; 423/94; 423/150; 210/754; 210/913; 210/912; 210/634
[58] Field of Search .............. 210/753, 754, 768, 710, 210/711, 726, 739, 912, 913, 634; 423/38, 39, 40, 109, 150, 94; 75/101 R, 114

[56] References Cited

U.S. PATENT DOCUMENTS

| | | | |
|---|---|---|---|
| 1,041,407 | 10/1912 | Baxteres | 423/38 |
| 1,485,909 | 3/1924 | Christensen | 423/38 |
| 4,083,921 | 4/1978 | Wesely | 423/38 |
| 4,337,128 | 6/1982 | Haakonsen et al. | 423/109 |
| 4,343,706 | 8/1982 | Etzel et al. | 210/912 |
| 4,448,696 | 5/1984 | White, Jr. | 423/150 |

*Primary Examiner*—Peter Hruskoci
*Assistant Examiner*—Coreen Y. Lee
*Attorney, Agent, or Firm*—Arthur E. Oaks; Gregory F. Wirzbicki

[57] ABSTRACT

A method for removing and recovering toxic heavy metal contaminants from an iron-bearing sludge is provided. The method comprises one or more cycles of a two step, controlled chloride leach comprising a first non-acidic chloride leaching solution and a second acidic chloride leaching solution, wherein said toxic heavy metals are separated from said sludge and said iron-bearing sludge is a substantially non-hazardous material.

114 Claims, 1 Drawing Sheet

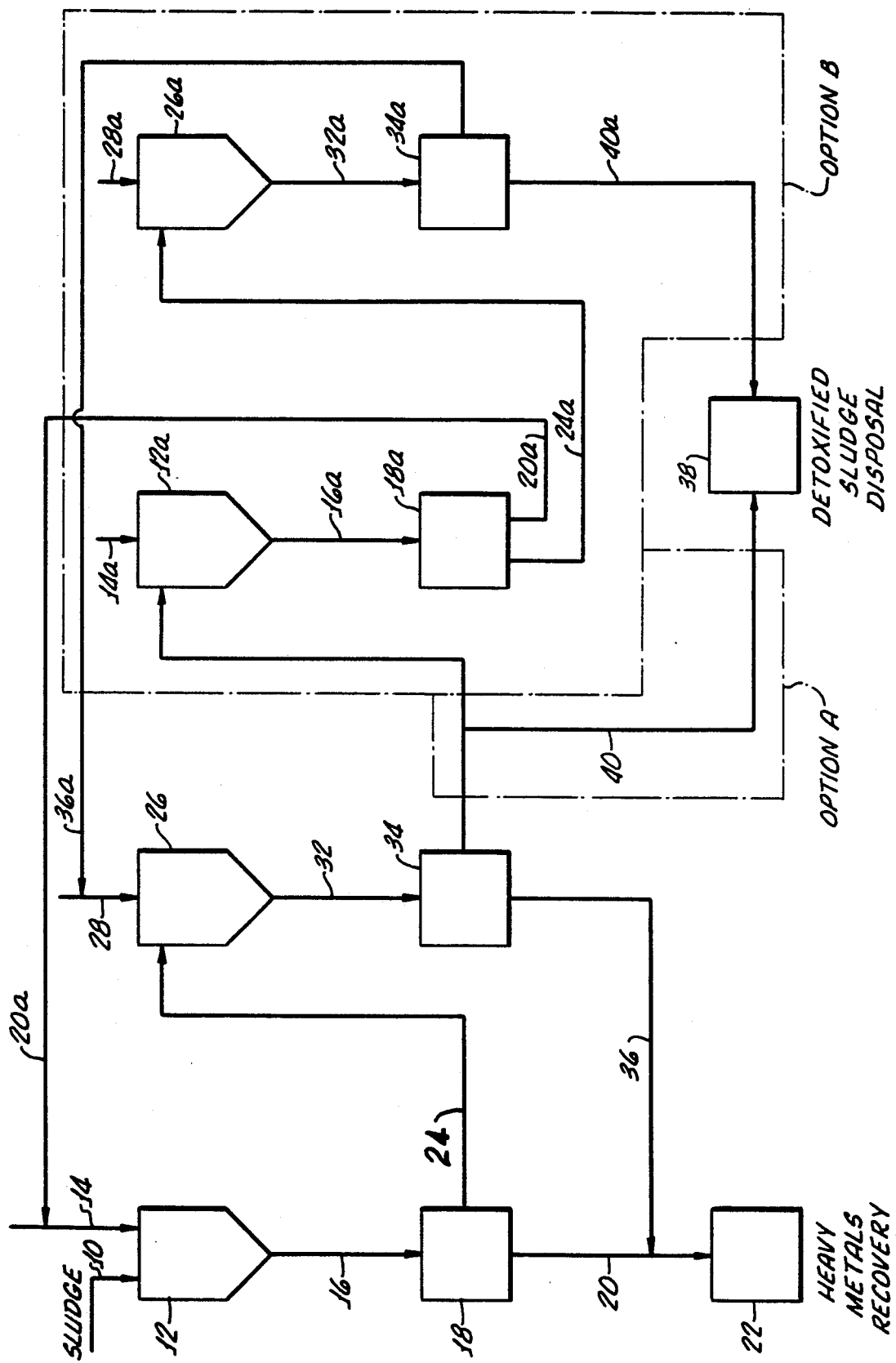

CHLORIDE LEACHING OF IRON-BASED, HEAVY METAL-CONTAINING SLUDGES

BACKGROUND OF THE INVENTION

The present invention relates generally to the removal and recovery of various heavy metals from precipitated iron-bearing sludges. As used herein, the term "heavy metals" refers to both the cationic and anionic forms of non-ferrous metals and metalloids (e.g., arsenic) which have an atomic number greater than that of calcium.

There is increasing concern over the hazards posed by the rising levels of heavy metals in the world's water supplies. Most heavy metals are toxic to some degree to all life-forms, with aqueous concentrations even as low as 0.05 ppm being hazardous to many aquatic flora and fauna. In humans, toxic heavy metal poisoning can lead to severe nervous system disorders and, in extreme cases, death. Even trace amounts of heavy metals are potentially dangerous, because they do not decompose over time (as do most organic pollutants) and often accumulate within an organism throughout its lifetime. This accumulation effect is accentuated in succeeding species along the food chain.

As a consequence of this problem, "industry" is being forced to abandon many previously used toxic waste water disposal techniques such as deep well injection, and to replace them with treatment processes capable of virtually eliminating heavy metals from aqueous wastes. In many cases, however, this requirement is very difficult to fulfill. The metal finishing industry, for example, employs a variety of processes which, typically, generate large volumes of aqueous waste material. Many of these wastes contain concentrations in excess of 10% of heavy metals such as zinc, nickel, copper, chromium, lead, cadmium, iron, tin, gold, and silver. Since over a billion gallons of such wastes are generated daily by the 8000 or so metals finishing plants operating in the United States, it is obvious that a considerable amount of toxic waste solution is formed.

In response to this, numerous heavy metals removal methods including evaporation/crystallization, absorption, dialysis, electrodialysis, reverse osmosis and ion exchange have been proposed for the metals finishing and plating industries, with varying degrees of success. Another method is to sequester and remove toxic heavy metals in a flocculated coagulant comprised of one or more hydrated oxides of iron. At the present time, however, the most usual method for removing these metals is by alkali precipitation, forming a semi-solid "sludge" of insoluble metal hydroxides, and disposing of this material by depositing it in a certified "toxic waste" landfill.

However, the number of toxic waste landfills is relatively low and the sheer volume of these wastes is rapidly depleting the space available in them. Furthermore, there is considerable resistance in most communities to either creating new landfills or enlarging old ones. This, coupled with the size of the paperwork trail which must be created for each shipment, adds up to a situation wherein the price for disposing these wastes is becoming an ever-increasing fraction of the "cost of doing business." For example, fees, transportation costs, and other expenses for such disposal can easily reach as much as $500/ton of sludge. It would be highly desirable if the amount of sludge could be reduced.

SUMMARY OF THE INVENTION

The present invention is directed to treating iron-based sludges containing heavy metals, in particular those sludges produced from a waste water treatment process involving the in-situ formation of an amorphous ferric hydroxide based sludge to "kinetically" sequester and remove the heavy metals from waste waters containing heavy metals. This technique, known as the Unipure SM process, is described in common assignee's copending U.S. application Ser. No. 042,565 filed Apr. 16, 1987 (EPO application Ser. No. 84901534.2), both applications being incorporated hereinto by reference, and has proven to be quite effective in removing toxic metals from a variety of different types of contaminated waste water streams, with the flocculated filtered sludge being a mixture of an amorphous, oxyferric hydroxide (hereinafter referred to as "ferric hydroxide") and various waste heavy metals. However, this mixture, while a free-flowing powder when dried, actually contains up to about 80% "bound" water of hydration. Because of this, the disposal costs/ton of anhydrous sludge are relatively high, and the economics of the process would be improved if at least some of this water would be removed and/or one or more of the toxic metals are profitably recovered from the sludge. Further, since this process starts with a ferrous chloride solution as the basis for the hydroxide precipitant, it would also be desirable to recover and convert all, or at least most, of the iron in the sludge back to ferrous chloride for reuse.

While heating the sludge for some period of time will remove the bound water and, therefore, lower the weight of the sludge, such a practice is not generally cost-effective. In addition, the various sludge processing techniques currently available have, so far, proven to be unable either to remove enough of the heavy metals therein either to "certifiably" detoxify the sludge at a reasonably acceptable cost, or to prevent unacceptably large (i.e., in excess of about 25%) iron loses from the sludge so treated. As used herein, the term "certifiable" means that the levels of toxic metals in a treated sludge are all below those which would, per the requirements of the federal Solid Waste Disposal Act, as defined by the EPA in 40 CFR 240 et seq, necessitate disposal of the sludge in a hazardous waste landfill.

Examination of the sludge produced by this process shows that the heavy metals appear to be incorporated thereinto in two separate ways. Although the invention is not limited to any theory of operation, it appears that the largest percentage (60-90%) is either adsorbed onto the flocculated precipitate surfaces or physically entrapped or "occluded" within the confines of the precipitated ferric hydroxide particles, with the bonding forces holding the metals thereon being relatively weak. However, the remainder appears to be chemically bound to the structure of the basic ferric hydroxide precipitate in the form of one or more complex chemical species. While simple alkali chloride leaching techniques will remove most, if not all, of the adsorbed and entrapped metals, it has been found by the present inventors that such techniques do not remove these "bound" metals.

Accordingly, in the present invention, a method is provided for selectively treating flocculated heavy metal contaminated iron-based sludges from an industrial waste water treatment facility, to remove the heavy metal contaminants therefrom, with a minimum loss of the iron therein. The method comprises one or more cycles of a two-step, controlled chloride leaching process adapted to produce a ferric hydroxide material from such sludges in which in excess of 90%, preferably in excess of 95% and, more preferably in excess of 99%, of the original heavy metal content is removed. In the most preferred embodiment, the resultant heavy metals-free ferric hydroxide material is certifiably non-hazardous and can be either sent to a conventional landfill for disposal or recovered for a variety of commercial and industrial uses. The heavy metals extracted from the sludge can be recovered by one or more conventional metals-producing processes.

BRIEF DESCRIPTION OF THE DRAWING

The present invention will be more readily understood by reference to the drawing which schematically illustrates the preferred embodiment of invention.

DETAILED DESCRIPTION OF THE INVENTION

The method of the present invention is intended to be used with flocculated, amorphous, iron-based sludges produced from industrial waste waters containing one or more heavy metal contaminants. In the Unipure SM process, these sludges are produced by a process in which an anionic carrier precipitate precursor ($OH^-$) and a cationic carrier precursor ($Fe^{+3}$) are caused to rapidly react within the waste water solution under a controlled pH to form, in situ, amorphous insoluble ferric hydroxide carrier particles having a high degree of surface activity. In this process, it is found that as the carrier precursors react, the toxic heavy metals present coprecipitate with them, with the result that they are quickly removed from the aqueous solution, either by adsorption onto the surfaces of the carrier particles or by occlusion within the particle structure. By so doing, it is found that the heavy metals, such as zinc, nickel, copper, chromium, lead, cadmium, tin, gold and silver, originally present in the waste water, are now substantially all found in the sludge. The term "occlusion," as used herein, refers to the entrapment of foreign ions, both by physical encapsulation and by chemical bonding, within the particle structure. It has also been found that the effluent water from waste streams so treated is environmentally innocuous and meets all current federal and state standards for discharge into municipal sewer systems. In fact, it is frequently quite suitable for reuse in the industrial process generating the wastes. In the present invention, the sludges produced by such a process are used as the preferred starting material.

The basic method of the present invention involves one or more two-step cycles of controlled chloride leaches. The two individual leaching operations within each cycle remove both adsorbed and occlude heavy metals, so that they can be economically concentrated, separated and recovered, said leaching operations further minimizing the loss of iron from the sludge.

In the present method, the sludge is introduced through conduit 10 to reactor 12, wherein a first portion of the heavy metals contained in the sludge is removed. This occurs when a suspension of the sludge is contacted with an aqueous solution of one or more non-acidic chloride salts, introduced via conduit 14, said salt solution containing at least a substantial proportion of the chlorine present as chloride ($Cl^-$) ions. As used herein, the term "non-acidic" when applied to a given chloride salt means that, at a concentration of ½% by weight, a deionized water solution thereof will have a pH equal to or above a value of 4.0, and the term "acidic" therefore means that at the same concentration the chloride solution will have a pH below 4.0. In practice, it is found that the leaching action is most effective when chlorides which form neutral or approximately neutral solutions (i.e., the solution pH is between about 4.5 and about 7.5) are used. Suitable chloride salts include alkaline earth chlorides, such as calcium, magnesium and barium chloride, alkali metal chlorides, such as lithium, sodium and potassium chlorides, and ammonium chloride. For reasons of cost, ready availability, and freedom from subsequent processing problems, both sodium and ammonium chlorides are equally preferred, except when relatively large amounts of amine-complex forming metals, such as copper, nickel and zinc are present, in which case, only sodium chloride is preferred. "Acid" chlorides, i.e., salts which, when dissolved in water tend to hydrolyze to form solutions of hydrochloric acid having pH values below about 4.0, such as aluminum or ferric chloride, should not be used for this first chloride leach, since the acid tends to solubilize the iron in the sludge. This hydrolysis also produces a gelatinous precipitate which is found to complicate both the liquid/sludge contact during leaching and the subsequent separation of the sludge from the leaching solution.

The exact operating conditions used within reactor 12 will depend upon the particular heavy metal contaminants present and their concentrations in the sludge. Typically, the first chloride solution will have a pH between about 4.5 and 7.5 (usually due to the presence of the salt alone in the solution) and have a chloride ion molar concentration between about 1.0 and about 10.0, preferably between about 2.0 and about 5.0. In addition, the solution will be at a temperature ranging from about 150° F. to about 210° F., with about 180° F. to about 200° F. being preferred. With such a solution, a leaching time of between about 1 and about 5 hours is generally required when the amount of sludge suspended in the leachant is between about 5 and about 50 percent by weight, preferably between about 15 and about 30 percent by weight, of the combined weight of liquid and sludge composition. Contact with the salt solution is greatly improved when the solution is vigorously agitated to first break up the sludge mass into a multiplicity of small colloidal particles and then keep them suspended. Accordingly, such agitation is preferred and can be provided by mechanical means such as by a stirrer, and/or by introducing an air stream through a sparger or similar bubble generator (not shown).

While the exact mechanism by which the chloride ions act to desorb the heavy metals without attacking the iron in the sludge is not fully understood, it is postulated that desorption and diffusion occur when the chloride ions react with the adsorbed metal species on the sludge particles to first break the physical bonds holding them onto the particle and then convert most, if not all, of the insoluble heavy metal hydroxides to soluble chlorides or oxychlorides of the individual metals present. These, in turn, diffuse out of, or off of, the particles and then are washed away by the agitated leaching solution. Regardless of the exact mechanism involved, it is found that this first chloride leach, when performed as described above, will normally remove from about 20 to 90 percent, more usually from about 30 to about 85 percent, and most usually from about 40 to about 80 percent by weight of the heavy metal contaminants originally present in the sludge, with only a negligible loss of the iron therein, usually less than 5 percent, by weight.

At the conclusion of the first leaching operation, the suspension is removed from reactor 12 via conduit 16 to separation means 18, typically a filter, wherein the treated sludge and heavy metals-containing chloride leachant solution are separated, with the leachant and any wash solution used being sent, via conduit 20, to recovery unit 22 and with the separated sludge proceeding, via conduit 24, to a second leaching operation in reactor 26.

The second step of the leaching cycle is the treatment of the sludge from separation means 18 to displace the still unextracted residual heavy metals. This second step is analogous to the first leaching operation, i.e., the sludge in reactor 26 is contacted with a second chloride-ion containing aqueous leachant introduced via conduit 28 with vigorous agitation to break up and suspend the sludge particles. Suitable metal chlorides for this second leaching operation are those previously defined as "acid" chlorides, preferably ferric chloride, such acid chlorides usually being provided in a total concentration of 0.01 to 1.5 M, preferably 0.03 to 0.3 M and most preferably 0.05 to 0.15 M. At such concentration, the pH of the solution will normally be between about 2.0 and about 4.0.

In this step it is theorized that the metal cations from the acid salts react with the bound metal-iron complexes within, said reaction resulting in the exchange of the cation of the leachant for the heavy metal atoms in the particulate structure, said exchanged metals now being displaced and free to diffuse to the particle surfaces and be washed away, as in the previous leaching step. The extent to which such exchange and displacement occurs in the sludge is a function of the relative stabilities of the individual ligand-metal complexes formed during the original hydroxide precipitation process, the strength of the chemical bonding between the solid matrix ligand and the leachant, and the mass action effects determined by the metal ion concentration and equivalency ratios. In other words, the order of complexion of the metal ions will be determined primarily by their relative equilibrium constants.

In the chemical system under consideration, the dominant solid matrix ligand is the hydroxide ion, with the metal pairs of interest being the metals plus the chloride counterion. Table 1 shows typical log K equivalency values at 25° C., for hydroxide ion/metal complexes in solution at zero ionic strength as published by Smith and Martell in Volume 4, "Inorganic Complexes" of their treatise "Critical Stability Constants" (Plenum Press, New York, 1976).

TABLE 1

| Metal Ion | Hydroxide ion |
|---|---|
| $Fe^{+3}$ | 11.8 |
| $Cr^{+3}$ | 10.1 |
| $Al^{+3}$ | 9.0 |
| $Pb^{+2}$ | 6.3 |
| $Cu^{+2}$ | 6.3 |
| $Zn^{+2}$ | 5.0 |
| $Fe^{+2}$ | 4.5 |
| $Ni^{+2}$ | 4.1 |
| $Mn^{+2}$ | 3.4 |
| $Ca^{+2}$ | 1.3 |
| $Na^{+1}$ | −0.2 |

These equilibrium constants show that ferric iron is the most effective at breaking the various heavy metal/hydroxide ion ligands in the sludge and, therefore, at displacing chemically bound heavy metal constituents therein. They also explain why the sodium ions in the first leaching operation cannot do so. However, as noted hereinabove, ferric chloride, while most effective, and therefore preferred as the second chloride leaching agent, is not suitable as the first leachant, since it readily hydrolyzes in solution to form a stable, amorphous hydrated oxide and a dilute solution of hydrochloric acid. It is also found that the presence of a colloidal hydrated ferric hydroxide as formed by such hydrolysis will, under some conditions, quickly form agglomerates with the extremely minute colloidal sludge particles which, in turn, entrap large amounts of water by adsorption and capillary forces, thus converting the entire liquid/ suspension to a stiff gel having the appearance and consistency of chocolate pudding. When this happens, the subsequent displacement and separation of the residual bound heavy metals from the sludge becomes quite difficult, if not impossible.

In the present invention, the problem of gelation is avoided in several ways. To begin with, the first sodium chloride leach greatly reduces the heavy metals concentration in the sludge, so much less ferric chloride is required in the second leaching step to displace the residual heavy metals than would be needed if it were the only or first leachant. Secondly, the operating parameters of the second leaching step, such as the weight of the sludge put into the suspension, the operating temperature, and the ferric ion concentration in the suspension are all adjusted to minimize gel formation. Each of these factors has an independent effect insofar as gel formation propensity is concerned. In the present invention, it is found that, in general, gelation is less likely to happen when the solids content of the sludge treated in the second leaching step constitutes between about 1 and about 10 weight percent of the total sludge/water mass and the temperature is kept below about 200° F., preferably in the range between about 150° to about 190° F. With these operating conditions, it is found (1) that the level of acid attack on the ferric hydroxide particles is greatly reduced and (2) that heavy metal extractions can be successfully performed when the ferric chloride concentration in the leachant is between about 0.03 and about 0.3 M, preferably between about 0.05 and 0.15 M, with the leaching time being from about 1 to about 5 hours. Such a molar concentration will generally provide an iron equivalency equal to between about 1 to about 20 times those of the combined residual heavy metals in the sludge.

Still a further, and possibly the most effective, protection against gelation is provided by including a soluble, non-acidic salt, such as sodium or ammonium chloride, in the ferric chloride-containing leachant solution. When this is done, the large surplus of positive and negative ions in the solution neutralizes the attractive surface charges on the sludge particles, so that coagulation and gelation are effectively suppressed. Further, when non-acidic chloride salts are used, the extra level of chloride ion in the solution also reduces the tendency of the ferric chloride to hydrolyze, thus preventing excessive iron losses from the sludge and making more ferric ion available for the displacement reactions. This extra protection further permits an increase in the amount of solids which can be processed in this step to be perhaps as much as 30% of the total mass of sludge plus water.

In the present invention, all these advantages are most conveniently provided by dissolving ferric chloride or other acid metal chloride, generally in concentrations as specified above, in a chloride-containing solution as described hereinbefore for the first leaching operation. Preferably, and most ideally, the two solutions are identical but for the presence of the acid metal chloride therein. Further, since one of the products of the present invention is a substantially heavy metals-free ferric hydroxide, some or all of the ferric chloride requirements for this step can be provided by dissolving some of the final processed sludge in hydrochloric acid and returning the resultant solution to reactor 26.

At the conclusion of the second leaching step, the leached suspension is sent via conduit 32 to separation means 34 while the filtrate is sent via conduit 36 to recovery unit 22. When the second leach is performed as hereinabove described, not only are coagulation and gelation avoided, but the heavy metals content has generally been reduced by about 90 to 100 percent compared to that originally found in the sludge prior to the first leaching step. Further, the treated sludge particles are readily filtered out of the suspension, with the amount of iron lost in this second leaching step being typically less than 20%, preferably less than 10%.

The separated leachant from these operations comprises a solution of the solubilized salts of the extracted heavy metals in the chloride leaching agent. Techniques for concentrating, separating and recovering the individual metals in solutions containing such heavy metals are well known. For example, where lead chloride is present, a simple chilling operation to below about 60° F. will cause much of it to precipitate in substantially pure form (See Table 2 in Example 1 hereinafter), and filtration is all that is needed to recover it. Other well-known metals separation techniques, including ion exchange, selective precipitation, and various electrolytic methods may also be applied to the combined leachants.

In some cases, a single application of the two leaching steps described above will be sufficient to allow the treated sludge to be certified as being non-hazardous, according to the criteria established in federal regulations such as 40 CFR 240 et seq, and many state solid waste disposal regulations such as 22 Cal Code of Regulations, Chapter 30. When this happens, the sludge cake can be sent to sludge recovery unit 38, via conduit 40 for disposition. This is shown in the schematic drawing as Option A with the treated ferric hydroxide material either being sent to a conventional landfill, recovered as a substantially pure ferric oxide powder, or dissolved with hydrochloric acid to yield e.g., a 20 to 30 weight percent ferric chloride solution. Such a solution could either be sold as an article of commerce, recycled for use as the active agent in the second leach, or reduced to a ferrous chloride solution for recycling back into the original Unipure SM process.

In other cases, however, it is found that a single application of the above-described two-step chloride leaching process will not accomplish the desired amount of heavy metals removal from the sludge. In the present invention, when such a situation occurs, a second application of the procedure will generally suffice to accomplish such a removal. Occasionally, where the original concentration of contaminants is extremely high, a third, or even more, repetitions of the two leaching steps may be needed before a satisfactory level of heavy metals removal is achieved.

In the schematic drawing, a second cycle of the preferred leaching procedure is shown as option B with the processing in each of the two leaching steps in the second cycle being basically the same as that described hereinabove. Consequently, the numerical identification of the individual reactors, conduits, etc., is the same, but with an "a" suffix attached thereto. In these subsequent cycles, however, since the concentration of residual heavy metals in the sludge is generally quite low, the amount of ferric chloride needed in the second chloride-containing solution can be reduced to levels of between about 1% and about 25% as compared to that used in the first application of the second leach. Such a concentration will provide a ferric ion molar equivalency which is generally at least 1, preferably at least about 5, more preferably at least about 10, and most preferably at least about 20 times the total number of equivalents of residual bound heavy metals in the sludge. Of course, the greater the amount of excess ferric ion present, the more efficient the displacement reaction.

Also, the disposition of the filtered leachants is different. Because the heavy metals content in each of these leachants is normally very low, if they were to be sent to recovery unit 22 there would be an excessive dilution of the heavy metals-containing solution therein. To avoid this, as well as to reduce the total amount of process water required, the leachants from these additional leaching operations are each recycled via conduits 20a and 36a for further use as the leaching media in the corresponding steps of the prior leaching operation, with additional chloride salts, if needed, being added through conduits 14 and 28. Normally, this does not create any processing problems because the heavy metals concentrations in these recycled chloride-containing solutions are generally so low that neither the leaching solution/heavy metal equilibria set up in reactor 26 during the first ferric chloride leach nor the rates of displacement and extraction of the bound heavy metals are significantly altered. Further, with the more dilute ferric chloride solutions used in these subsequent leaches, very little, if any, of the ferric hydroxide in the treated sludge is lost. Where more than two cycles of the leaching process are required, the leachants would, of course, be recycled back into the next previous operation and the same general comments apply.

In summary, the two-step method of the present invention is found to be capable of producing a ferric hydroxide material from which at least 90%, usually at least 95%, and preferably in excess of 99% of heavy metals in the sludge have been removed, with iron losses being less than 20%, preferably less than 10%, as compared to the original sludge. The final sludge contains less than 5%, preferably less than 1%, by weight total heavy metals. Further the removed heavy metals contained in the combined solutions are now available for recovery.

While the treated hydroxide material will still contain an amount of "bound" water, typically ranging from about 20 to about 50% by weight, this is not considered to be as serious a problem as it was with the original contaminated sludge. Thus, for example, where the sludge is dissolved in HCl for reuse, either in the present process or in the previous Unipure SM process, the bound water simply becomes part of the solution. Where the treated sludge is not so dissolved and sent, instead, to a municipal land fill, the weight penalty imposed by this water is minor since such disposal costs much less compared to the costs and other problems involved with disposal of the original toxic metal-contaminated sludge.

EXAMPLE 1

Fifty grams of a dried, iron-based, kinetically precipitated Unipure SM sludge having an iron content of about 46% (calculated as metal) and about 5.1 grams of lead (also calculated as metal) was slowly added, with stirring, to form a slurry in about 500 cc of a 4.0 M solution of ammonium chloride in deionized water previously heated to a temperature of about 180° F. The slurry was leached in the chloride solution, with agitation, for about 4 hours, during which time the temperature was slowly raised to about 200° F. At the conclusion of this time, the hot slurry was vacuum filtered, after which the sludge was repulped with about 500 cc of room temperature deionized water and refiltered. The combined filtrate measured about 900 cc and was only slightly yellowish in color, showing that very little, if any, of the iron in the sludge had dissolved. After cooling the filtrate overnight to room temperature, crystals of white lead chloride precipitated out of the solution, which could be easily separated and recovered therefrom by filtration. Analysis of these crystals showed them to be 99.9 percent pure $PbCl_2$, with the levels of impurities being as shown in the following Table 2 below.

TABLE 2

| Element | Concentration (% of total metal) |
|---|---|
| lead | 99.9 |
| sodium | .01 |
| calcium | .01 |
| iron | .003 |
| zinc | .002 |
| manganese | .001 |
| chromium | .001 |
| copper | .0005 |

The wet filtered sludge, which initially weighed about 136 grams, was dried for 24 hours at a temperature of 105° C. after which time it weighed 42.05 grams. Analysis of the dried cake showed that its iron content had increased to about 55.5 percent and that the weight of lead (as metal) therein was about 1.867 grams. Based on the weight of lead in the original sludge, this represents a reduction of about 63%.

EXAMPLE 2

About 40 grams of the dried sludge recovered from Example 1 (containing 1.78 gm of lead, calculated as lead) was reslurried with vigorous agitation in 800 cc of deionized water and heated to about 150° F., after which 5.58 grams of ferric chloride was added. Agitation was continued for an additional two hours, during which time the temperature was slowly raised to about 210° F., at which time the suspension coagulated to form a gel with a volume of about 800 cc. An additional 450 cc of hot deionized water was then added to the mass with agitation and stirred for an additional three hours at a temperature of about 160° F., after which about half of the partially broken high viscosity gel was vacuum filtered, with the remaining half being kept at a temperature of about 160° F. After about 30 minutes, an additional 200 cc of the gelled sludge was added to the filter, with the remaining 400 cc being added, in 200 cc amounts at 30 minute intervals thereafter.

The filtration was continued for about 30 hours after which time about 1030 cc of a clear, pale yellow solution was obtained, The wet filtered sludge, which initially weighed 139.25 grams, was dried for 24 hours at 110° C. after which its weight was 37.06 grams of material with a residual lead metal content of 0.29 grams of lead, for about an 84% reduction during the ferric chloride leach of Example 2 and a 94% reduction overall from the start of Example 1. (Note: The latter calculation required taking into account that only 40 grams of the 42.05 grams of material produced at the end of Example 1 was treated in Example 2.) The foregoing two examples show that the two-step process of the invention can effect at least a 90% reduction in the lead content of the sludge, and indeed, a reduction of at least 94%. Analysis of the filtrate indicated that only about 5% of the original iron content of the raw sludge was dissolved therein.

EXAMPLE 3

The leaching procedures of Examples 1 and 2 were repeated with the dried filter cake recovered from Example 2 (i.e., the sludge was put through a second leaching cycle), with the exception that the solution used for the ferric chloride leach contained about 86 grams of ammonium chloride and about 0.30 grams of ferric chloride dissolved in water. In this leach, the temperature was maintained at about 180° F., with no evidence of coagulation and gelation being observed. After about 2 hours, the suspension was filtered without difficulty. The residual sludge cake had a relatively low water content and dried quickly. Comparative analyses of the levels and percentages of heavy metal contaminants found in the original sludge and in a 20 wt. % solution of the treated sludge from this second leaching cycle in hydrochloric acid are shown in Table 3 below. The PPM values show the individual concentrations (calculated as the metal content of the material, the balance being mostly oxide) found in the sludge sample used in Example 1 and in the final filter cake from the second leach cycle. The weight percentages express the levels of the metallic iron and other metals based on the total of the PPM values for said metals, i.e., wt. % of individual metal to total metal.

TABLE 3

| | initial sludge | | 20% solution of treated sludge in HCl | |
|---|---|---|---|---|
| Element | (ppm) | (wt %) | (ppm) | (wt %) |
| iron | 460,000 | 80.58 | 60,000 | 99.55 |
| lead | 98000 | 17.17 | 16 | .03 |
| zinc | 5150 | .90 | 10 | .02 |
| manganese | 2250 | .39 | 59 | .10 |
| calcium | 1620 | .28 | 35 | .06 |
| sodium | 1380 | .22 | 45 | .07 |
| silicon | 1230 | .18 | 42 | .07 |
| aluminum | 1000 | .17 | 11 | .02 |
| copper | 1000 | .17 | 8 | .01 |
| chromium (total) | 292 | .05 | 22 | .04 |
| nickel | 272 | .05 | 15 | .02 |
| molybdenum | 59 | .01 | 6 | .005 |

The data in Table 3 indicate that, after 2 cycles of the process of the present invention, the "purity" of the iron had risen from 80.58 to 99.55%, i.e., the "other" metals content (including non-heavy metals) in the final sludge was found to be less than 1%, indeed less than 0.5%, by weight, calculated as "other" metals to total metals, with less than 500 ppmw, in fact less than 400 ppmw, of the final sludge composition being said "other" metals. In addition, the total heavy metal concentration of the final sludge was less than 0.5 percent, in fact, less than 0.25 percent by weight of the total metals concentration, with less than 250 ppmw, in fact less than 150 ppmw, of the final sludge composition being said heavy metals. Note that the percentages in Table 3 of the residual toxic heavy metals in the treated sludge are all below the federal limits for its safe reuse, or disposal, should that be desired. Analysis of the pale yellow filtrate showed that about an additional 2 percent of the iron in the sludge had been dissolved.

The above examples show that, with the procedure of the present invention, significant reductions in the amounts of major sludge pollutants, such as lead, can be obtained with the total iron loss being less than 10 percent. In many cases, the sludge will satisfy federal requirements for certification as being nonhazardous. However, short of this, the sludge will still be eminently suitable for recycle back into the Unipure SM process, thus providing an opportunity to operate this process in a manner such that little, if any, of the sludge produced need be discarded. Also, the toxic materials are concentrated into a smaller, lower weight mass which is much more readily suited to many conventional metals-extraction processes than was the original sludge. Further, the efficacy of an additional chloride constituent in the ferric chloride leaching solution as a means of preventing coagulation and gelation is clearly shown.

Although the figure and above discussion are directed to a continuous process, one can also perform the several steps as a series of individual batch operations. Further, in either mode of operation, each of the several leaching operations may comprise several leaching reactors, with the leachant and sludge particles progressing therethrough either in concurrent or countercurrent flow. No special facilities are needed to perform the leaching and separation operations described, with the exception that the metallic portions of the tanks, mixing equipment, filters, piping, etc., used should not be sensitive to the presence of chlorides or acid media.

This invention may be embodied in other specific forms without departing from the spirit or essential characteristics thereof. The present embodiments and examples are, therefore, to be considered in all respects as illustrative and not restrictive, the scope of the invention being indicated by the appended claims, and all changes which come within the scope and equivalency of the claims are intended to be embraced therein.

We claim:

1. A method for removing heavy metals from an iron-based sludge comprising the steps of leaching the sludge with a first aqueous leaching solution, said solution comprising a non-acidic chloride, separating the first leaching solution from said sludge, leaching the separated sludge with a second aqueous leaching solution comprising a dissolved acidic metal chloride, and separating the second leaching solution from said sludge, both of said leaching steps being performed to displace and remove the heavy metals from said sludge with a minimum loss of iron therein.

2. The method of claim 1 wherein said first solution only contains one or more chlorides selected from the group consisting of barium chloride, calcium chloride, magnesium chloride, lithium chloride, potassium chloride, sodium chloride and ammonium chloride, and the second solution comprises a chloride selected from the group consisting of ferric chloride and aluminum chloride.

3. The method of claim 1 wherein said non-acidic chloride is sodium or ammonium chloride and said acidic chloride is ferric chloride.

4. The method of claim 1 wherein said non-acidic chloride is sodium chloride and the first leaching solution has a chloride ion molar concentration between about 1.0 and 10.0.

5. The method of claim 4 wherein said molar concentration is between about 2.0 and about 5.0.

6. The method of claim 5 wherein said first leaching step is conducted with an amount of sludge equal to between about 5 and about 50 percent of the combined weight of sludge and leaching solution for a time between about 1 and about 5 hours.

7. The method of claim 1 wherein said first leaching step is conducted at a solution temperature between about 150° F. and about 210° F.

8. The method of claim 6 wherein said first solution temperature is between about 180° F. and about 200° F.

9. The method of claim 4 wherein said acidic chloride is ferric chloride and the second leaching solution has a ferric ion molar concentration between about 0.03 and 0.3.

10. The method of claim 9 wherein said ferric ion molar concentration is between about 0.05 and 0.15.

11. The method of claim 1 wherein the second leaching solution further comprises a non-acidic metal chloride dissolved therein.

12. The method of claim 10 wherein the second leaching solution comprises an aqueous solution having the same composition as said first leaching solution, except that ferric chloride is dissolved therein.

13. The method of claim 1 wherein the temperature of the second leaching solution is below about 200° F.

14. The method of claim 12 wherein the temperature of the second leaching solution is between about 150° F. and about 190° F., and the leaching step is conducted with an amount of sludge having a solids content equal to between about 1 and about 30 percent of the combined weight of sludge and leaching solution for a time between about 1 and about 5 hours.

15. The method of claim 14 wherein both of said leaching steps further comprise separating the leaching solution from said sludge, with the second leaching solution being used to treat the separated sludge from the first step.

16. The method of claim 15 wherein the amount of toxic heavy metals in said sludge is reduced by at least about 90 percent.

17. The method of claim 15 wherein the amount of toxic heavy metals in said sludge is reduced by at least about 95 percent.

18. A method as defined in claim 15 wherein the iron-based sludge contains lead and said method further comprises a step for recovering lead chloride from said sludge, said step comprising combining and chilling the separated leachants to precipitate the lead chloride.

19. The method of claim 15 comprising subjecting the separated sludge from said second step to one or more additional cycles each comprised of said first and second leaching steps, with each of the separated leaching solutions being used as at least part of the leaching solution for the corresponding step in the previous cycle of leaches.

20. The method of claim 19 wherein the molar concentration of ferric chloride in the second leaching solution for each of said additional leaching cycles is between about 1 and about 25 percent of that in the second leaching solution used in the first leaching cycle.

21. The method of claim 19 wherein the total amount of toxic heavy metals in said sludge is reduced by at least about 90 percent.

22. The method of claim 19 wherein the total amount of toxic heavy metals in said sludge is reduced by at least about 95 percent.

23. A method as defined in claim 19 wherein the iron-based sludge contains lead and said method further comprises a step for recovering lead chloride from said sludge, said step comprising combining and chilling the separated leachants to precipitate the lead chloride.

24. The method of claim 16 wherein the total amount of iron loss from the sludge in both of said leaching steps is no more than about 20 weight percent of the iron originally present in the sludge.

25. The method of claim 16 wherein the total amount of iron loss from the sludge in both of said leaching steps is no more than about 10 weight percent of the iron originally present in the sludge.

26. The method of claim 3 wherein the pH of the first leaching solution is between about 4.0 and about 7.5 and the pH of the second leaching solution is below about 4.0.

27. The method of claim 10 wherein the pH of the first leachant is between about 4.0 and about 7.5 and the pH of the second leaching solution is below about 4.0.

28. The method of claim 11 wherein the pH of the first leaching solution is between about 4.0 and about 7.5 and the pH of the second leaching solution is below about 4.0.

29. The method of claim 12 wherein the pH of the first leaching solution is between about 4.0 and about 7.5 and the pH of the second leaching solution is below about 4.0.

30. The method of claim 1 wherein the pH of the first leaching solution is between about 4.0 and about 7.5 and the pH of the second leaching solution is below about 4.0.

31. The method of claim 1 wherein the total amount of iron loss from the sludge in both of said leaching steps is no more than about 10 weight percent of the iron originally present in the sludge.

32. The method of claim 1 wherein the total amount of iron loss from the sludge in both of said leaching steps is no more than about 20 weight percent of the iron originally present in the sludge.

33. A method as defined in claim 1 wherein the iron-based sludge contains lead and a final product is produced having a lead concentration less than 0.5% of the lead concentration initially present in the sludge.

34. The method of claim 33 wherein the lead concentration of said final product is less than 0.1% of the lead concentration initially present in the sludge.

35. A method as defined in claim 1 wherein the iron-based sludge contains zinc and a final product is produced having a zinc concentration less than 1.0% of the zinc concentration initially present in the sludge.

36. The method of claim 35 wherein the zinc concentration of said final product is less than 0.3% of the zinc concentration initially present in the sludge.

37. A method as defined in claim 1 wherein the iron-based sludge contains manganese and a final product is produced having a manganese concentration less than 5% of the manganese concentration initially present in the sludge.

38. The method of claim 37 wherein the manganese concentration of said final product is less than 3% of the manganese concentration initially present in the sludge.

39. A method as defined in claim 1 wherein the iron-based sludge contains copper and a final product is produced having a copper concentration less than 5% of the copper concentration initially present in the sludge.

40. The method of claim 39 wherein the copper concentration of said final product is less than 3% of the copper concentration initially present in the sludge.

41. A method as defined in claim 1 wherein the iron-based sludge contains chromium and a final product is produced having a chromium concentration less than 15% of the chromium concentration initially present in the sludge.

42. The method of claim 41 wherein the chromium concentration of said final product is less than 10% of the chromium concentration initially present in the sludge.

43. A method as defined in claim 1 wherein the iron-based sludge contains nickel and a final product is produced having a nickel concentration less than 12% of the nickel concentration initially present in the sludge.

44. The method of claim 43 wherein the nickel concentration of said final product is less than 7% of the nickel concentration initially present in the sludge.

45. A method as defined in claim 1 wherein the iron-based sludge contains molybdenum and a final product is produced having a molybdenum concentration less than 20% of the molybdenum concentration initially present in the sludge.

46. The method of claim 45 wherein the molybdenum concentration of said final product is less than 12% of the molybdenum concentration initially present in the sludge.

47. The method of claim 1 wherein said sludge is a kinetically sequestered iron-based sludge.

48. The method of claim 47 wherein said first leaching solution only contains one or more chlorides selected from the group consisting of barium chloride, calcium chloride, magnesium chloride, lithium chloride, potassium chloride, sodium chloride and ammonium chloride, and the second leaching solution comprises a chloride selected from the group consisting of ferric chloride and aluminum chloride.

49. The method of claim 47 wherein said non-acidic chloride is sodium or ammonium chloride and said acidic chloride is ferric chloride.

50. The method of claim 47 wherein said non-acidic chloride is sodium chloride and the first leaching solution has a chloride ion molar concentration between about 1.0 and 10.0.

51. The method of claim 50 wherein said molar concentration is between about 2.0 and about 5.0.

52. The method of claim 51 wherein said first leaching step is conducted with an amount of sludge equal to between about 5 and about 50 percent of the combined weight of sludge and leaching solution for a time between about 1 and about 5 hours.

53. The method of claim 52 wherein said first solution temperature is between about 180° F. and about 200° F.

54. The method of claim 49 wherein the pH of the first leaching solution is between about 4.0 and about 7.5 and the pH of the second leaching solution is below about 4.0.

55. The method of claim 48 wherein the pH of the first leaching solution is between about 4.0 and about 7.5 and the pH of the second leaching solution is below about 4.0.

56. The method of claim 50 wherein said acidic chloride is ferric chloride and the second leaching solution has a ferric ion molar concentration between about 0.03 and 0.3.

57. The method of claim 56 wherein the pH of the first leaching solution is between about 4.0 and about 7.5 and the pH of the second leaching solution is below about 4.0.

58. The method of claim 56 wherein said ferric ion molar concentration is between about 0.05 and 0.15.

59. The method of claim 58 wherein the second leaching solution comprises an aqueous solution having the same composition as said first leaching solution, except that ferric chloride is dissolved therein.

60. The method of claim 59 wherein the temperature of the second leaching solution is between about 150° F. and about 190° F., and the leaching step is conducted with an amount of sludge having a solids content equal to between about 1 and about 30 percent of the combined weight of sludge and leaching solution for a time between about 1 and about 5 hours.

61. The method of claim 60 wherein both of said leaching steps further comprise separating the leaching solution from said sludge, with the second leaching solution being used to treat the separated sludge from the first leaching step.

62. The method off claim 61 wherein the amount of toxic heavy metals in said sludge is reduced by at least about 90 percent.

63. The method of claim 61 wherein the amount of toxic heavy metals in said sludge is reduced by at least about 95 percent.

64. The method of claim 61 wherein the iron-based sludge contains lead and said method further comprises a step for recovering lead chloride from said sludge, said step comprising combining and chilling the separated leaching sludge solutions to precipitate the lead chloride.

65. The method of claim 61 comprising subjecting the separated sludge from said second step to one or more additional cycles each comprised of said first and second leaching steps, with each of the separated leaching solutions being used as at least part of the leaching solution for the corresponding step in the previous cycle of leaches.

66. The method of claim 65 wherein the molar concentration of ferric chloride in the second leaching solution for each of said additional leaching cycles is between about 1 and about 25 percent of that in the second leaching solution used in the first leaching cycle.

67. The method of claim 65 wherein the total amount of toxic heavy metals in said sludge is reduced by at least about 90 percent.

68. The method of claim 65 wherein the total amount of toxic heavy metals in said sludge is reduced by at least about 95 percent.

69. The method of claim 65 wherein the iron-based sludge contains lead and said method further comprises a step for recovering lead chloride from said sludge, said step comprising combining and chilling the separated leaching solutions to precipitate the lead chloride.

70. The method of claim 62 wherein the total amount of iron loss from the sludge in both of said leaching step is no more than about 20 weight percent of the iron originally present in the sludge.

71. The method of claim 62 wherein the total amount of iron loss from the sludge in both of said leaching steps is no more than about 10 weight percent of the iron originally present in the sludge.

72. The method of claim 47 wherein said first leaching step is conducted at a solution temperature between about 150° F. and about 210° F.

73. The method of claim 47 wherein the second leaching solution further comprises a non-acidic metal chloride dissolved therein.

74. The method of claim 73 wherein the pH of the first leaching solution is between about 4.0 and about 7.5 and the pH of the second leaching solution is below about 4.0.

75. The method of claim 47 wherein the temperature of the second leaching solution is below about 200° F.

76. The method of claim 47 wherein the total amount of iron loss from the sludge in both of said leaching steps is no more than about 20 weight percent of the iron originally present in the sludge.

77. The method of claim 47 wherein the total amount of iron loss from the sludge in both of said leaching steps is no more than about 10 weight percent of the iron originally present in the sludge.

78. The method of claim 47 wherein the iron-based sludge contains lead and a final product is produced having a lead concentration less than 0.5% of the lead concentration initially present in the sludge.

79. The method of claim 78 wherein the lead concentration of said final product is less than 0.1% of the lead concentration initially present in the sludge.

80. The method of claim 47 wherein the iron-based sludge contains zinc and a final product is produced having a zinc concentration less than 1.0% of the zinc concentration initially present in the sludge.

81. The method of claim 80 wherein the zinc concentration of said final product is less than 0.3% of the zinc concentration initially present in the sludge.

82. The method of claim 47 wherein the iron-based sludge contains copper and a final product is produced having a copper concentration less than 5% of the copper concentration initially present in the sludge.

83. The method of claim 82 wherein the copper concentration of said final product is less than 3% of the copper concentration initially present in the sludge.

84. The method of claim 47 wherein the iron-based sludge contains chromium and a final product is produced having a chromium concentration less than 15% of the chromium concentration initially present in the sludge.

85. The method of claim 84 wherein the chromium concentration of said final product is less than 10% of the chromium concentration initially present in the sludge.

86. The method of claim 47 wherein the iron-based sludge contains nickel and a final product is produced having a nickel concentration less than 12% of the nickel concentration initially present in the sludge.

87. The method of claim 86 wherein the nickel concentration of said final product is less than 7% of the nickel concentration initially present in the sludge.

88. The method of claim 47 wherein the iron-based sludge contains molybdenum and a final product is produced having a molybdenum concentration less than 20% of the molybdenum concentration initially present in the sludge.

89. The method of claim 88 wherein the molybdenum concentration of said final product is less than 12% of the molybdenum concentration initially present in the sludge.

90. The method of claim 47 wherein the pH of the first leaching solution is between about 4.0 and about 7.5 and the pH of the second leaching solution is below about 4.0.

91. The method of claim 47 wherein the iron-based sludge contains manganese and a final product is produced having a manganese concentration less than 5% of the manganese concentration initially present in the sludge.

92. The method of claim 91 wherein the manganese concentration of said final product is less than 3% of the manganese concentration initially present in the sludge.

93. A method for removing toxic heavy metal contaminants from an iron-based sludge comprising a first step of leaching the sludge with a first leaching solution comprised of about a 2 to about a 5 M leaching solution of sodium chloride, at a temperature between about 180° F. to about 200° F. for between about 1 to about 5 hours, said sludge being present in an amount between about 15 and 30 percent of the combined weight of sludge and first leaching solution, said leaching being followed by a separation of said sludge from said first leaching solution, with the solution being sent for heavy metals recovery and the separated sludge proceeding to a second step comprising leaching the separated sludge with a second aqueous leaching solution having between about 2 to about 5 M sodium chloride and between about 0.05 to about 0.15 M ferric chloride, at a temperature between about 150° F. to about 180° F., said separated sludge being present in an amount between about 1 and about 5 percent of the combined weight of sludge and second leaching solution, said second leaching being followed by a second separation of said sludge from said said second leaching solution, said sludge having the total toxic heavy metals content thereof reduced by at least about 90 percent, and with the total amount of iron loss from the sludge in both of said leaching steps being no more than about 20 weight percent of the iron originally present in the sludge.

94. The method of claim 83 wherein when the separated sludge from said second step is subjected to one or more additional cycles comprised of said first and second leaching steps, the second leaching solution used therefor has a ferric chloride concentration which is between about 1 and about 25 percent of that used in the first cycle leaching solution, with each separated leaching solution being used to provide at least part of the leaching solution for the corresponding step in the previous cycle of leaches.

95. The method of claim 94 wherein the total amount of toxic heavy metals in said sludge is reduced by at least about 95 percent.

96. The method of claim 95 wherein the total amount of iron dissolved from the sludge in both of said leaching steps is no more than about 10 weight percent of the iron originally present in the sludge.

97. The method of claim 94 wherein the total amount of iron dissolved from the sludge in both of said leaching steps is no more than about 10 weight percent of the iron originally present in the sludge.

98. The method of claim 94 wherein the pH of the first leaching solution is between about 4.0 and about 7.5 and the pH of the second leaching solution is below about 4.0.

99. The method of claim 93 wherein the total amount of iron dissolved from the sludge in both of said leaching steps is no more than about 10 weight percent of the iron originally present in the sludge.

100. The method of claim 93 wherein the pH of the first leaching solution is between about 4.0 and about 7.5 and the pH of the second leaching solution is below about 4.0.

101. A method as defined in claim 93 wherein the iron-based sludge contains lead and said method further comprises a step for recovering lead chloride from said sludge, said step comprising combining and chilling the separated leachants to precipitate the lead chloride.

102. A method for removing heavy metals from an iron-based sludge comprising one or more cycles comprising the steps of leaching the sludge with a first leaching solution consisting essentially of an aqueous solution, said solution comprising a non-acidic chloride, separating the first leaching solution from said sludge, leaching the separated sludge with a second leaching solution consisting essentially of an aqueous solution of an acidic metal chloride in combination with a non-acidic chloride, and separating the second leaching solution from said sludge, both of said leaching steps being performed to displace and remove the heavy metals from said sludge without loss of the iron in excess of 25 weight percent therein.

103. The method of claim 102 wherein the total amount of iron loss from the sludge in both of said leaching steps is no more than about 20 weight percent of the iron originally present in the sludge.

104. The method of claim 102 wherein the total amount of iron loss from the sludge in both of said leaching steps is no more than about 10 weight percent of the iron originally present in the sludge.

105. The method of claim 103 wherein the pH of the first leaching solution is between about 4.0 and about 7.5 and the pH of the second leaching solution is below about 4.0.

106. The method of claim 102 wherein the pH of the first leaching solution is between about 4.0 and about 7.5 and the pH of the second leaching solution is below about 4.0.

107. A method for removing heavy metals from a kinetically sequestered iron-based sludge comprising the steps of leaching the sludge with a first leaching solution at a temperature below about 210° F., said solution comprising a non-acidic chloride, separating the first leaching solution from said sludge, leaching the separated sludge with a second leaching solution, at a temperature below about 200° F., comprising an acidic metal chloride, and separating the second leaching solution from said sludge, both of said leaching steps being performed leaching steps being performed to displace and remove the heavy metals from said sludge without loss of the iron in excess of 25 weight percent in the sludge.

108. The method of claim 107 wherein said leached sludge has the toxic heavy metals content thereof reduced by at least about 90 percent and the total amount of iron lost from the sludge in both of said leaching steps is no more than about 20 percent of that originally present in the sludge.

109. The method of claim 108 wherein the pH of the first leaching solution is between about 4.0 and about 7.5 and the pH of the second leaching solution is below about 4.0.

110. The method off claim 107 wherein the pH of the first leaching solution is between about 4.0 and about 7.5 and the pH of the second leaching solution is below about 4.0.

111. A method for removing heavy metals from a kinetically sequestered iron-based sludge comprising one or more cycles comprising the steps of leaching the sludge with a first leaching solution, said solution consisting essentially of a non-acidic chloride at a temperature below about 210° F., separating the first leaching solution from said sludge, leaching the separated sludge with a second leaching solution at a temperature below about 200° F., said solution consisting essentially of an acidic metal chloride in combination with a non-acidic chloride, and separating the second leaching solution from said sludge, both of said leaches being performed without to displace and remove the heavy metals from said sludge without loss of the iron in excess of 25 weight percent in the sludge.

112. The method of claim 111 wherein the total amount of iron loss from the sludge in both of said leaching steps is no more than about 10 weight percent of the iron originally present in the sludge.

113. The method of claim 111 wherein the total amount of iron loss from the sludge in both of said leaching steps is no more than about 20 weight percent of the iron originally present in the sludge.

114. The method of claim 111 wherein the pH of the first leaching solution is between about 4.0 and about 7.5 and the pH of the second leaching solution is below about 4.0.

* * * * *

UNITED STATES PATENT AND TRADEMARK OFFICE
CERTIFICATE OF CORRECTION

PATENT NO. : 4,888,053

DATED : December 19, 1989

INVENTOR(S) : Gerard Grayson and Morton M. Wong

It is certified that error appears in the above-identified patent and that said Letters Patent is hereby corrected as shown below:

In the Specification, column 2, line 45, after "et seq," insert therefor -- most particularly at section 261.24 --

Claim 64, column 15, line 39, after "leaching" delete "sludge".

Claim 94, column 17, line 42, delete "83" and insert therefor -- 93 --.

Signed and Sealed this

Thirtieth Day of April, 1991

Attest:

HARRY F. MANBECK, JR.

Attesting Officer

Commissioner of Patents and Trademarks